US009680309B2

(12) United States Patent
Kohout

(10) Patent No.: US 9,680,309 B2
(45) Date of Patent: Jun. 13, 2017

(54) AUTO LOAD SWITCH DETECTION FOR WIRELESS POWER RECEIVER

(71) Applicant: Active-Semi, Inc., Road Town, Tortola (VG)

(72) Inventor: James A. Kohout, Dallas, TX (US)

(73) Assignee: Active-Semi, Inc. (VG)

( * ) Notice: Subject to any disclaimer, the term of this patent is extended or adjusted under 35 U.S.C. 154(b) by 667 days.

(21) Appl. No.: 14/086,629

(22) Filed: Nov. 21, 2013

(65) Prior Publication Data
US 2015/0137610 A1    May 21, 2015

(51) Int. Cl.
*H02J 5/00* (2016.01)
*H02J 7/02* (2016.01)

(52) U.S. Cl.
CPC .............. *H02J 5/005* (2013.01); *H02J 7/025* (2013.01)

(58) Field of Classification Search
CPC ................................... H02J 5/005; H02J 7/025
USPC ......................................................... 307/104
See application file for complete search history.

(56) References Cited

U.S. PATENT DOCUMENTS

| | | | |
|---|---|---|---|
| 3,988,617 A | 10/1976 | Price | 326/97 |
| 4,712,544 A * | 12/1987 | Ensslin | A61B 18/12 606/39 |
| 5,502,632 A | 3/1996 | Warmerdam et al. | 363/98 |
| 7,880,338 B2 * | 2/2011 | Jin | H02J 5/005 307/104 |
| 8,476,836 B2 * | 7/2013 | van de Ven | 315/185 R |
| 2002/0047629 A1 | 4/2002 | Kastner | 315/291 |
| 2005/0116846 A1 * | 6/2005 | Bogner | H03M 1/109 341/118 |
| 2012/0293008 A1 | 11/2012 | Park et al. | 307/104 |
| 2013/0099588 A1 | 4/2013 | Yeo et al. | 307/104 |
| 2013/0176652 A1 | 7/2013 | Kim et al. | 361/86 |
| 2013/0279219 A1 * | 10/2013 | Oki | H02M 1/32 363/53 |
| 2015/0026486 A1 * | 1/2015 | Liu | G06F 1/26 713/300 |

* cited by examiner

*Primary Examiner* — Jared Fureman
*Assistant Examiner* — James Evans
(74) *Attorney, Agent, or Firm* — Imperium Patent Works; Helen Z. Mao; Amir V. Adibi

(57) ABSTRACT

Apparatus and methods are provided to automatically detect and control a load switch for a wireless power receiver. In one novel aspect, a method is provided to adaptively control the load switch based on the output condition of a rectified output according to a predefined criteria. In one embodiment of the invention, the methods to adaptively control the load switch comprises a first stage that turns on the load switch quickly; a second stage that stops turning on the load switch and holds the load switch at its current value; a third stage that slowly pulls down the load switch; and a fourth stage that quickly turns off the load switch. In another embodiment, an integrated circuit for a wireless power pick up unit is provided to control the load switch adaptively based on a rectified output feedback and a predefined criteria.

20 Claims, 9 Drawing Sheets

INTEGRATED CIRCUIT WITH LSW DRIVER CONTROL CIRCUIT WITH EXTERNAL LSW

INTEGRATED CIRCUIT FOR A WIRELESS PICK UP UNIT

SYSTEM DIAGRAM OF WIRELESS POWER SYSTEM

INTEGRATED CIRCUIT WITH LSW DRIVER CONTROL
CIRCUIT WITH EXTERNAL LSW

GATE DRIVE CIRCUIT FOR A N-TYPE LOAD SWITCH

GATE DRIVE CIRCUIT FOR A P-TYPE LOAD SWITCH

AUTO LOAD SWITCH DETECTION FOR WIRELESS POWER RECEIVER

TECHNICAL FIELD

The present disclosure relates generally to wireless power, and more particularly to power receiver of a wireless power system.

BACKGROUND INFORMATION

The concept of wireless power has been developed for a long time. It is until recent years, with the rapid development of microprocessor, wireless power becomes a viable solution. Today, wireless technology is growing at an exponential rate, with everything from phones to consumer electronics being wirelessly connected. Despite the rapid development in the technology, battery life of these devices remains a problem. Wireless power or wireless charging is designed to solve these problems.

Wireless power is also known as inductive charging. It requires two coils, a transmitter coil and a receiver coil. An alternative current passes through the transmitter coil, generating magnetic field. The magnetic field induces a voltage in the receiver coil, which can be used to power external load, such as to power a mobile device or to charge a battery.

In a wireless power/wireless charging system, a transmitter is connected with a power source. The transmitter contains a primary coil that generates a magnetic field. When a receiver, which has a secondary coil, makes contact or is in a close proximity of the transmitter, the transmitter and the receiver are magnetically coupled. Power transfers from the transmitter through coupled inductors, such as an air core transformer. The receiver takes the inputs from the secondary coil, and passes it through a rectifier circuit.

In modern integrated circuit designed for wireless power devices, the amount of the power transferred is controlled by internal control circuits. Control signals are transmitted from the receiver to the transmitter based on detected conditions at the receiver to increase or decrease power. Further, the receiver monitors receiver conditions and triggers internal protection mechanism. A wireless pick up unit in a wireless power receiver that receives input from the secondary coil, rectifies the input and outputs a rectified output (RECTOUT). The RECTOUT drives a load for the wireless power receiver applications.

The Wireless Power Consortium (WPC) is a standard body that develops and licenses a global interoperable standard for wireless charging. WPC has requirements for WPC medium power to have a separate load switch to shut off the wireless power receiver when an over voltage condition or other internal or external fault condition occurs. When a load switch is used, the load switch is connected to the RECTOUT and outputs a switched output RECTOUT_SW. While in theory the shut down circuit uses a simple switch as the load switch, it is complicated to control how to turn on the load switch in all possible operations. For example when a user puts a device onto a wireless charging station, the secondary coil of the power receiver in the device does not always align with the primary coil of the power transmitter in the charging station. Therefore, the actual available power transferred from the secondary coil is unknown because alignment is not determined until the load switch is turned on and the load is applied to the output. The issue is magnified when an integrated circuit for the wireless power pick up unit is designed to be used in different foreseeable applications, which have different load. For example, in a typical application, a RECTOUT capacitor is connected to the RECTOUT after the rectifier and before the load switch. A RECTOUT_SW capacitor is connected to the RECTOUT_SW after the load switch and connected to the load. The capacitor sizes of RECTOUT capacitor and RECTOUT_SW capacitor vary a large range for different applications. The load on the RECTOUT_SW varies as well.

A problem occurs when the load switch is turned on the voltage on RECTOUT drops because of the RECTOUT_SW capacitor and the load on RECTOUT_SW. If the available power from the secondary coil and the RECTOUT capacitor cannot supply the load to charge the RECTOUT_SW capacitor and the current required by RECTOUT_SW, the RECTOUT voltage will drop too low and triggers resets of the power receiver circuit.

FIG. 1 shows prior art circuit diagram of an integrated circuit 1 for a wireless power receiver. Integrated circuit 1 has two input terminals RX1 11, RX2 12, and a ground terminal GND 110. A series capacitor 3 and a parallel capacitor 4 make up the dual resonant circuit with a secondary coil 74. Secondary coil 74 receives power from a power-transmitter coil in a power transmitter unit and passes through the secondary dual resonant circuit, which includes series of parallel capacitances, capacitor 5 and capacitor 6, to be connected to the two input terminals, RX1 11 and RX2 12 of integrated circuit 1. The dual resonant circuit enhances the power transfer efficiency and enables a resonant detection method.

Full bridge rectifier circuit 40, coupled between input terminal RX1 11 and input terminal RX2 12, provides full-wave rectification of the AC waveform received from RX1 11 and RX2 12. The output of rectifier circuit 40 is connected to a rectifier output terminal RECTOUT 15. A RECTOUT capacitor 8 is connected to RECTOUT 15 and a ground.

A bootstrap circuit is used to power rectifier circuit 40. Two external bootstrap capacitors, bootstrap capacitor 5 and bootstrap capacitor 6 are connected to bootstrap terminal HSB1 13 and bootstrap terminal HSB2 14. A low voltage power, e.g. 5-volt, charges the bootstrap capacitors through a bootstrap diode 31 and a bootstrap diode 32, respectively. The bootstrap circuit, therefore, provides power to high side switches of rectifier circuit 40 in normal operation.

Integrated circuit 1 has detection and monitor circuitry that communicates with other circuits of a wireless receiver. Resistor 202 connects to RECTOUT 15 and a RECTOUT monitor terminal RECMO 18. RECMO 18 outputs a proportion of the rectified output to a monitor circuit of the wireless power receiver. Integrated circuit 1 also outputs regulated power. A 5V regulator 21 outputs a regulated 5 volt power to a 5V terminal 26. A 3.3V regulator 22 outputs a regulated 3.3 volt power to a 3.3V terminal 27. Two external capacitors 28 and 29 are connected to terminal 26 and 27, respectively. Integrated circuit 1 monitors these power outputs. A power OK circuit 23 monitors the output of 5V regulator 21 and sends output to a logic gate 201. A power OK circuit 24 monitors the output of 3.3V regulator 22 and sends output to logic gate 201. Logic gate 201 outputs a signal by taking the AND of the inputs. The output of logic gate 201 connects to a reset terminal 25. When the output of logic gate 201 indicates a power output problem, the signal is sent through reset terminal 25. The reset signal causes the reset of the wireless power receiver, which stops the transmission of power from the transmitter. It is, therefore, important to keep the output voltage at the right range to avoid the reset.

FIG. 1 also shows an output control circuit 50. Output control circuit 50 detects different signals and de-asserts an enable signal when one or more predefined conditions are met. Output control circuit 50 has logic gate 51. Logic gate 51 takes different input signals and outputs a control signal. The inputs of logic gate 51 can be various internal conditions. Examples of internal condition detection circuits include, over voltage (OVP) circuit 53, under voltage lockout (UVLO) circuit 54, thermal shutdown (TSD) circuit 55, and current limit and sense (CUR) circuit 56. The input signal can also include external signals, such as an output enable signal from output an enable terminal OUTEN 16. Upon detecting one or more signal that indicates an output shutdown condition, an output shutdown signal is asserted. Integrated circuit 1 enters output shutdown mode. If all the output shutdown conditions are cleared, the output shutdown signal is de-asserted and integrated circuit 1 enters regular mode. Logic gate 51 outputs an enable signal.

An external load switch 7 is coupled between a load switch (LSW) terminal 19 and RECTOUT 15. When load switch 7 is turned on, an end user load 73 is powered by the output of integrated circuit 1 through load 102. A RECOUT_SW capacitor 9 is connected to load switch 7. FIG. 1 shows an NMOS load switch that connects to a gate drive 59 through LSW terminal 19. When output control circuit 50 outputs a de-asserted enable signal, it turns off gate drive 59 and thereby turns off load switch 7. However, how to turn on the load switch is more complicated. For large end user load 73, the RECTOUT voltage can drop dramatically. If the available power from the transmitter coil cannot supply the large load, the RECTOUT voltage drops too low, the internal detection circuit like logic gate 201 sends a reset signal that resets integrated circuit 1.

Methods and structures for improving such wireless power receiver are sought.

SUMMARY

Apparatus and methods are provided for wireless power receivers. In one novel aspect, a method is provided to adaptively control a load switch based on the output condition of a rectified output according to a predefined criteria. In one embodiment of the invention, the methods to adaptively control the load switch comprises a first stage that turns on the load switch quickly; a second stage that stops turning on the load switch and holds the load switch at its current value; a third stage that slowly pulls down the load switch; and a fourth stage that quickly turns off the load switch. In another embodiment, an integrated circuit for a wireless power pick up unit is provided to control the load switch adaptively based on a rectified output feedback and a predefined criteria.

In another novel aspect, an integrated circuit for a wireless power pick up unit is provided. The integrated circuit includes a first rectifier input terminal RX1, a second rectifier input terminal RX2, a rectified output terminal RECTOUT, a rectifier circuit that receives input power from RX1 and RX2 and outputs a rectified voltage onto RECTOUT, and an adaptive load switch (LSW) driver control circuit coupled to RECTOUT and a load switch, wherein the adaptive LSW driver control circuit receives a rectified output feedback and outputs a control voltage to adaptively control the load switch based on the rectified voltage and a predefined criteria. In one embodiment of the current invention, the predefined criteria is configurable. In another embodiment of the current invention, the predefined criteria includes defining a number of control stages that the LSW driver control circuit adaptively controls the load switch. The predefined criteria may also include a set of predefined threshold values to determine different control stages. In one embodiment, LSW driver control circuit adaptively ramps up the load switch at different rates based on the rectified output according to the predefined criteria. In another embodiment of the current invention, the predefined criteria are configurable according to different applications.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
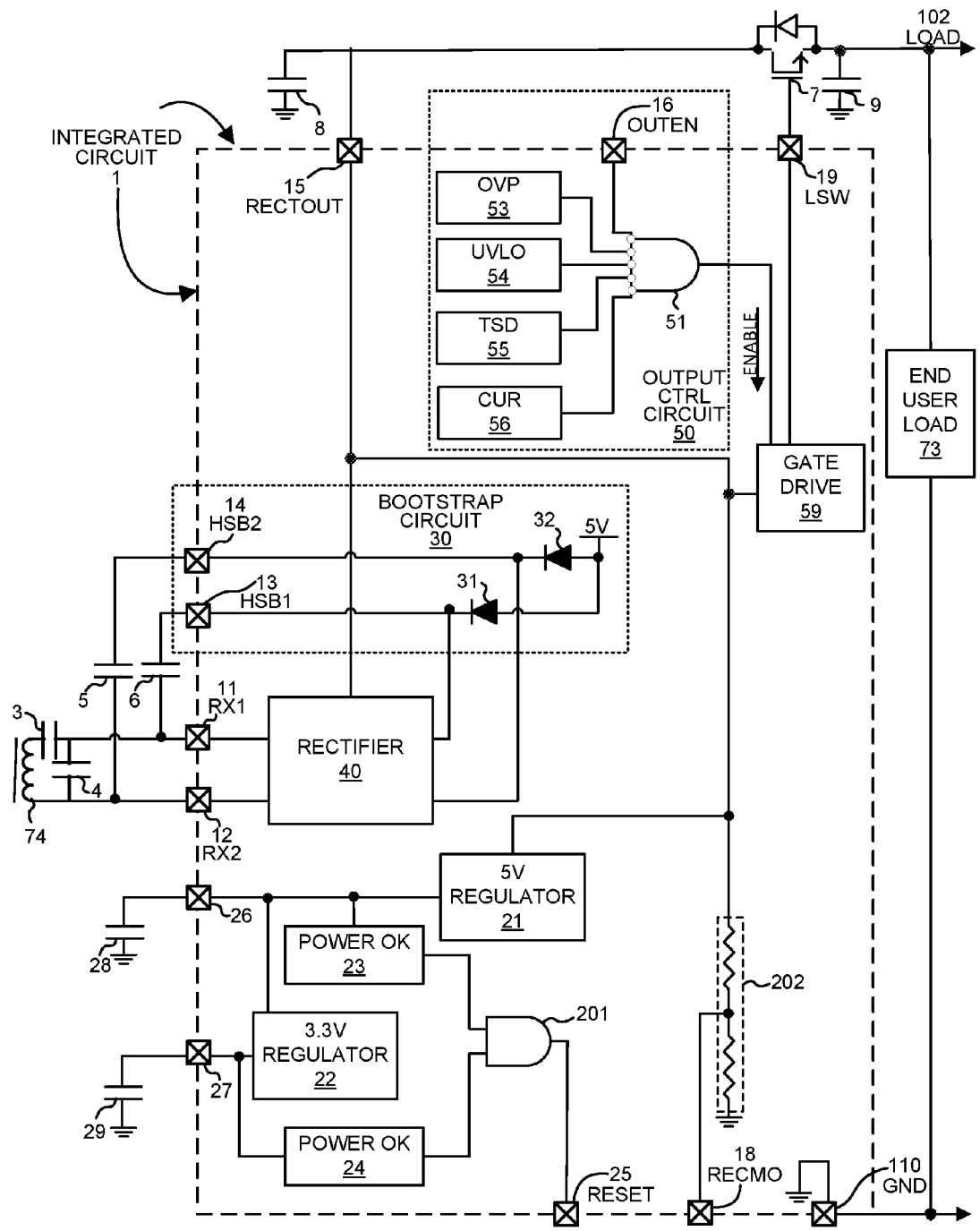
FIG. 1 shows prior art circuit diagram of an integrated circuit for a wireless power receiver.
Figure 2:
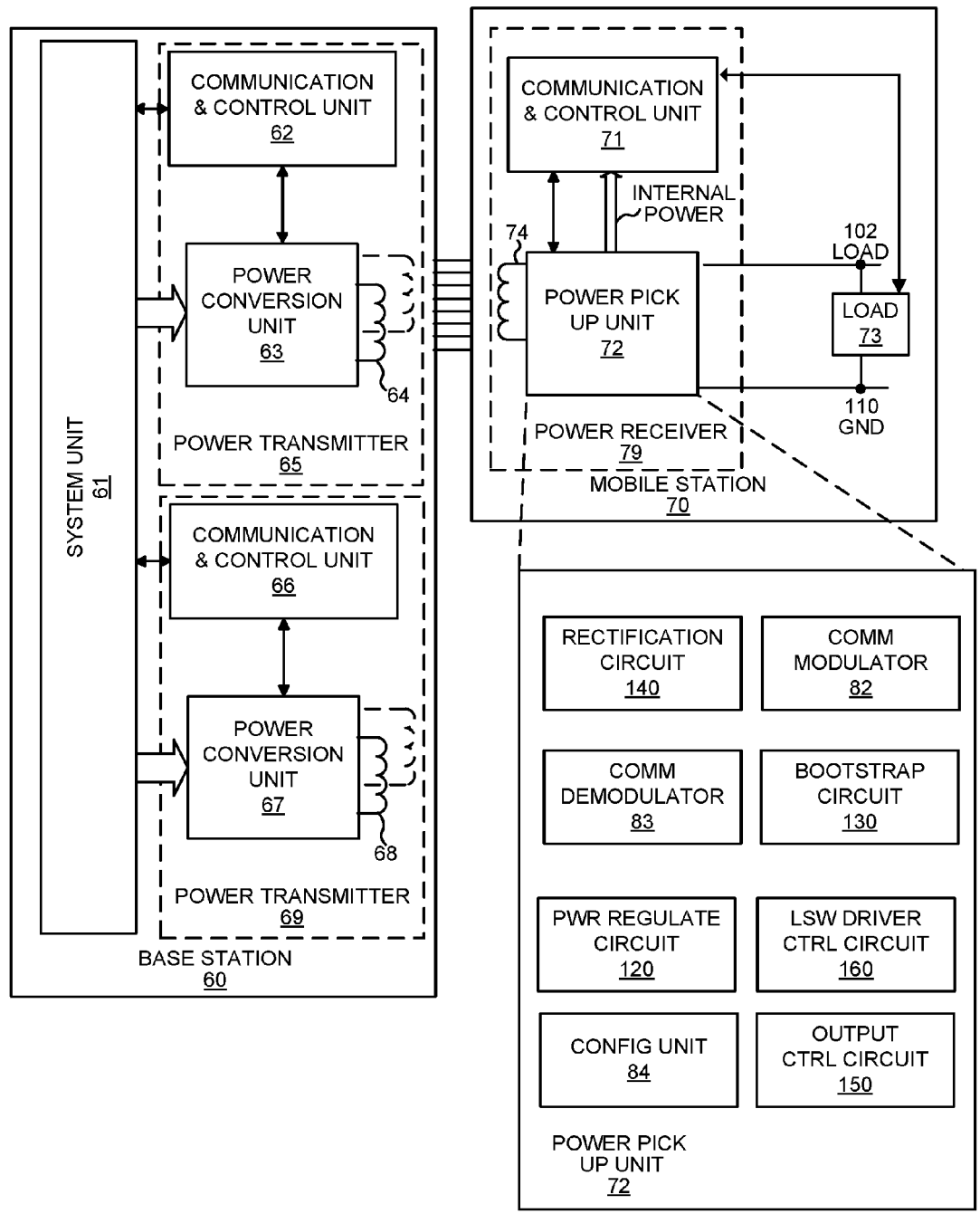
FIG. 2 is a system diagram of a wireless power system.

FIG. 2 is a system diagram of a wireless power system. The wireless power system comprises a base station 60 and a mobile station 70. Base Station 60 is a power transmitter unit, which comprises system unit 61, and one or more power transmitters, such as power transmitter 65 and power transmitter 69. A power transmitter in base station 60 normally has a communication and control unit, a power conversion unit, and a primary coil array. As shown, power transmitter 65 contains communication and control unit 62, power conversion unit 63, and primary coil array 64. Communication and control unit 62 regulates the transferred power to the level that the power receiver requests. Primary coil array 64 generates the magnetic field for power conversion unit 62. As shown in FIG. 2, base station 60 may contain multiple transmitters. For example, power transmitter 69 contains communication and control unit 66, power conversion unit 67, and primary coil array 68. System unit 61 comprises functional modules such as input power provisioning module, controller of multiple power transmitters, and user interface module.

FIG. 2 also shows functional blocks of mobile station 70. Mobile station 70 includes power receiver 79 and load unit 73. Power receiver 79 has communication and control unit 71, power pick up unit 72, and secondary coil 74. Secondary coil 74 captures the magnetic field for power pick up unit 72. Power pick up unit 72, unlike the power transmitter, normally has only one secondary coil. Mobile station 70, unlike base station 60, normally contains one power receiver. Communication and control unit 71 regulates the transferred power to the level that is appropriate for the subsystems connected to the output of the power receiver. Power pick up unit 72 outputs load voltage through load 102 and ground (GND) 110. Load unit 73 receives power from power receiver 79 via load 102 and GND 110. Load unit 73 receives power from power receiver 79 and communicates sensing and control information with communication and control unit 71. For example, load unit 73 may contain a circuit that measures the temperature of a rechargeable battery.

FIG. 2 further shows a detailed view of functional modules of power pick up unit 72. Power pick up unit 72 includes a rectification circuit 140, a communication modulator 82, a communication demodulator 83, a configuration unit 84, a bootstrap circuit 130, a power regulate circuit 120, an output control circuit 150 and load switch driver control circuit 160. Rectification circuit 140 provides full-wave rectification of the alternative current (AC) waveform, using a full bridge rectifier. Communication modulator 82, typically consists of a resistor in series with a switch, modulates signals to be transmitted to communication and control unit 71. Communication demodulator 83 demodulates signals received from communication and control unit 71. Bootstrap circuit 130 provides power to the high side switches of rectifier circuit 140. Bootstrap circuit 130 typically connects with external bootstrap capacitors through bootstrap terminals. Configuration unit 84 configures criteria for various operations. In one embodiment of the current invention, configuration unit configures the number of stages for an adaptive load switch control method. Configuration unit 84 may also configure one or more threshold values that are compared with the rectified voltage or output feedback information. Configuration unit 84 can use non volatile memory to carry out the configuration steps. It can also configure different criteria through external resistors. Configuration unit 84 may apply other types of methods as well. Power regulate circuit 120 outputs one or more regulated power voltages, such as regulated 5V power for internal and external use, or 3.3V power. Power regulate circuit 120 also monitors the regulated power output and asserts a reset signal when detecting output power problems according to predefined criteria. Output control circuit 150 prevents current from flowing to the output when the power receiver 79 does not provide power at its output. In addition, output control circuit 150 prevents current back flow into power receiver 79. Further, output control circuit 150 minimizes the power that power receiver 79 draws from a power transmitter when a power signal is first applied to secondary coil 74.

Load switch driver control circuit 160 provides gate drive for the load switch and provides controls to turn on the load switch. In one novel aspect of the current invention, LSW driver control circuit 160 takes feedback information of the rectified output. LSW driver control circuit 160 compares the rectified output feedback with predefined thresholds. Based on the output feedback information, LSW driver control circuit 160 adaptively controls the load switch. In one embodiment, LSW driver control circuit 160 adaptively ramps up the load switch at different rates based on the rectified output according to predefined criteria. In another embodiment of the current invention, the predefined criteria are configurable according to different applications. In one novel aspect, LSW driver control circuit 160 controls the load switch in multiple stages based on the rectified output.

Figure 3:
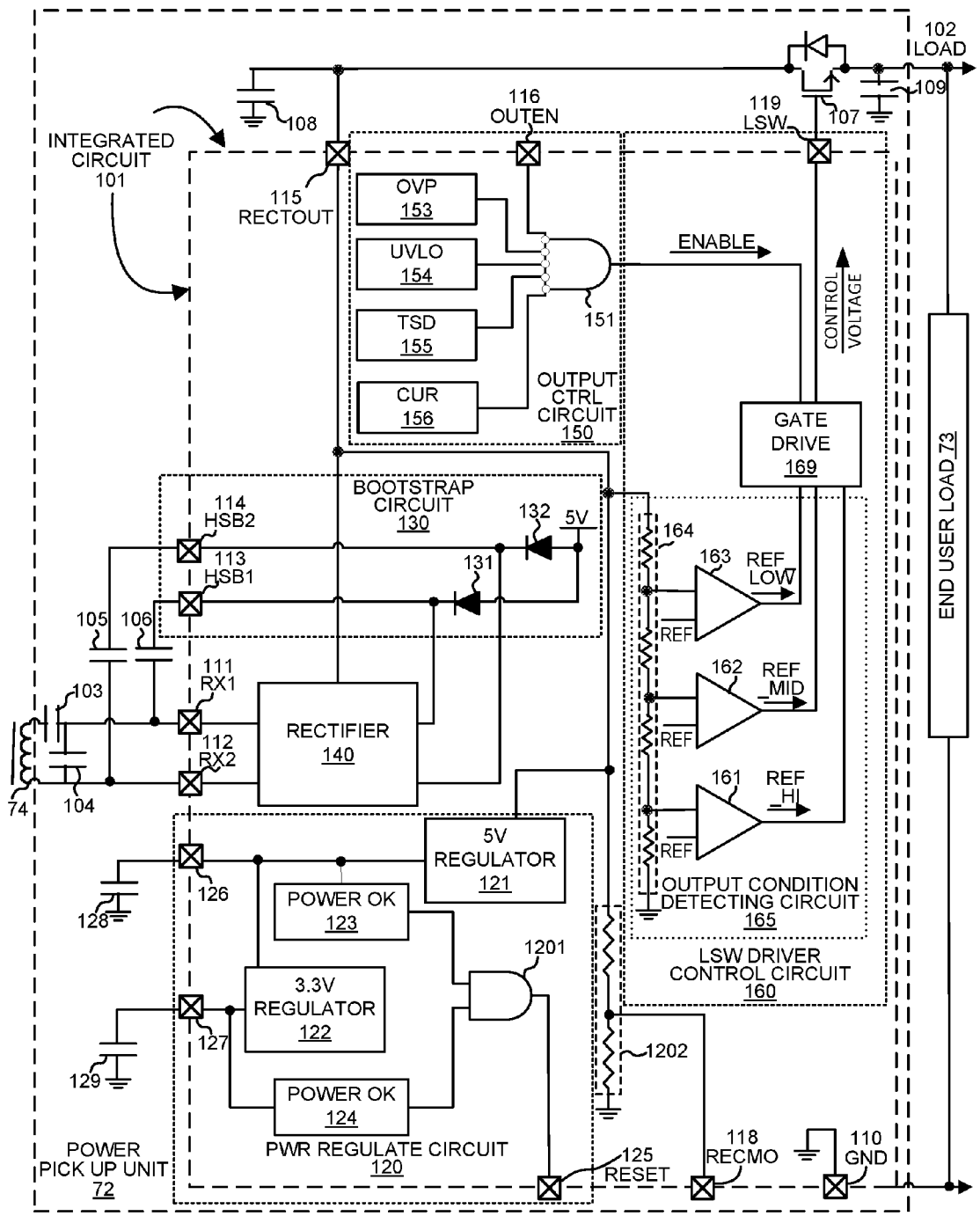
FIG. 3 shows an exemplary integrated circuit for a wireless power receiver that includes a load switch driver control circuit with an external load switch.

FIG. 3 shows an exemplary integrated circuit 101 for a wireless power receiver, which includes a load switch driver control circuit with an external load switch. FIG. 3 shows a secondary coil 74 and power pick up unit 72, which includes integrated circuit 101. Integrated circuit 101 has two input terminals RX1 111 and RX2 112, two high side bootstrap terminals HSB1 113 and HSB2 114, an output terminal RECTOUT 115 and a ground terminal GND 110. An external load switch 107 is connected to a load switch terminal 119 and a rectified output terminal RECTOUT 115. An external capacitor 109 is connected to load switch 107 and a ground. An external capacitor 108 is connected to RECTOUT 115 and a ground. FIG. 3 shows an N-type switch for load switch 107. In another embodiment of the current invention, load switch 107 can be a P-type switch.

Integrated circuit 101 has a rectifier circuit 140, a bootstrap circuit 130, an output control circuit 150, a power regulate circuit 120 and a LSW driver control circuit 160. In addition, integrated circuit 101 also has a rectified output monitor RECMO terminal 118. A resistor 1202 is connected to the RECTOUT 115 and RECMO 118. In one embodiment of the current invention, RECMO 118 outputs a proportion of the rectified output. Resistor 1202 can be configured to change the proportion of the RECMO output. In one embodiment of the current invention, RECMO outputs 1/20 of the rectified output.

For wireless power receivers, as shown in FIG. 2, the input power from secondary coil 74 depends on the alignment of the power receiver unit in the mobile station and the primary coil in the power transmitter unit in the base station. When the alignment between the primary coil and the secondary coil is off, the input power is not strong enough. This may cause the output power to be too low. In the modern circuit design, there are internal detections to monitor output power conditions. Power regulate circuit 120 includes circuits that output regulated power as well as circuits that detect output power conditions. A 5V regulator 121 and a 3.3V regulator 122 output 5V regulated power and 3.3V regulated power, respectively. The 5V regulated power is also used internally of integrated circuit 101 for 5V power such as supplying power to bootstrap circuit 130. In different types of design, the regulated power output can vary in values and are not limited to 5V or 3.3V. Terminals 126 and 127 connect to 5V regulator 121 and 3.3V regulator 122, respectively. Two external capacitors 128 and 129 are connected to terminals 126 and 127, respectively. Two external capacitors 128 and 129 are connected to terminals 126 and 127, respectively. Power regulate circuit 120 also has power detection circuits including a power ok circuit 123 and a power ok circuit 124. Power ok circuits 123 and 124 take input from 5V regulator 121 and 3.3V regulator 122, respectively. Logic gate 1201 takes the outputs from power ok circuits 123 and 124 and outputs a reset signal if both inputs indicate a problem. The output of logic gate 1201 is connected to a reset terminal 125. When the reset signal is asserted, the wireless power receiver will be reset. When the wireless power receiver resets, the wireless power transmitter will stop supplying power to the receiver. It is desirable to avoid the reset to make the wireless power system work properly. In one novel aspect of the current invention, load switch control circuit 160 is designed to minimize such impact.

FIG. 3 includes an exemplary LSW driver control circuit 160. LSW driver control circuit 160 has an output condition detecting circuit 165, a gate drive 169 and LSW terminal 119. In one embodiment of the current invention, output condition detecting circuit 165 has three comparators 161, 162 and 163. Output condition detecting circuit 165 also has a variable resistor 164 connected to the rectified output and a ground. The three comparators take a portion of rectified voltage RECTOUT through variable resistor 164 and compare with a reference voltage REF. In one embodiment, as shown in FIG. 3, three threshold values are predefined. A high-voltage threshold value HI, a middle-voltage threshold value MID, and a low-voltage threshold value LOW. Comparators 161, 162 and 163 connect to variable resistor 164 and take RECTOUT minus U1, RECTOUT minus U2 and RECTOUT minus U3, respectively. Variable resistor 164 is configured such that REF+U1 equals HI, REF+U2 equals MID and REF+U3 equals LOW. Comparator 161 compares the RECTOUT−U1 with the REF, comparator 162 compares RECTOUT−U2 with the REF, and comparator 163 compares RECTOUT−U3 with the REF. Comparators 161, 162 and 163 output compared results as condition signals REF_HI, REF_MID and REF_LOW, respectively. Gate drive 169 takes the condition signals of comparators 161, 162 and 163 and an enable signal of output control circuit 150 as its inputs. Gate drive 169 outputs a control voltage to adaptively control external load switch (LSW) 107 based on its inputs.

In one novel aspect, gate drive 169 is designed to have multiple stages to turn on LSW 107. Integrated circuit 101 is designed to support different applications. An end user load 73 is powered by output of integrated circuit 101 through load 102. End user load 73 varies a large range depending on different applications. Different end user load 73 results in different capacitance values for external capacitors 108 and 109. In some applications, end user load 73 is high causing a rapid drop of rectified output once end user load 73 is turned on. Internal monitoring and detection circuit will likely trigger reset signals and reset the chip. This is a costly operation and should be avoided. To avoid reset and to deal with fast drop of output, some mechanism is implemented to slowly turn on LSW 107. However, such design needs to consider the worst condition with large end user load. The trade off of this method is a long delay in turning on the output load. Such unnecessary delay impacts applications which do not have a large end user load. For such applications with low end user load, the LSW 107 can be quickly turned on. Therefore, though some protection mechanism can protect large end user load applications, it causes unnecessary delays to applications with lower end user delay. Further, even with the same end user load, the alignment of secondary coil on the receiver and the primary coil on the transmitter may vary during operation resulting in variation of output power. In one novel aspect of the current design, LSW driver control circuit 160 monitors the rectified voltage or output feedback information and adaptively adjusts the turning on of LSW 107 to solve the problem.

In one embodiment of the current invention, three comparators 161, 162 and 163 are used. Gate drive 169 based on the output of comparators 161, 162, and 163 implements a four-stage method to turn on LSW 107. Although three comparators are shown in FIG. 3, one or two comparators or more than three comparators can be used. Gate drive 169 is designed accordingly to take multiple-stage method to control LSW 107. Although an N-type external switch is shown in FIG. 3, in another embodiment of the current invention, a P-type external switch can be used.

Figure 4:
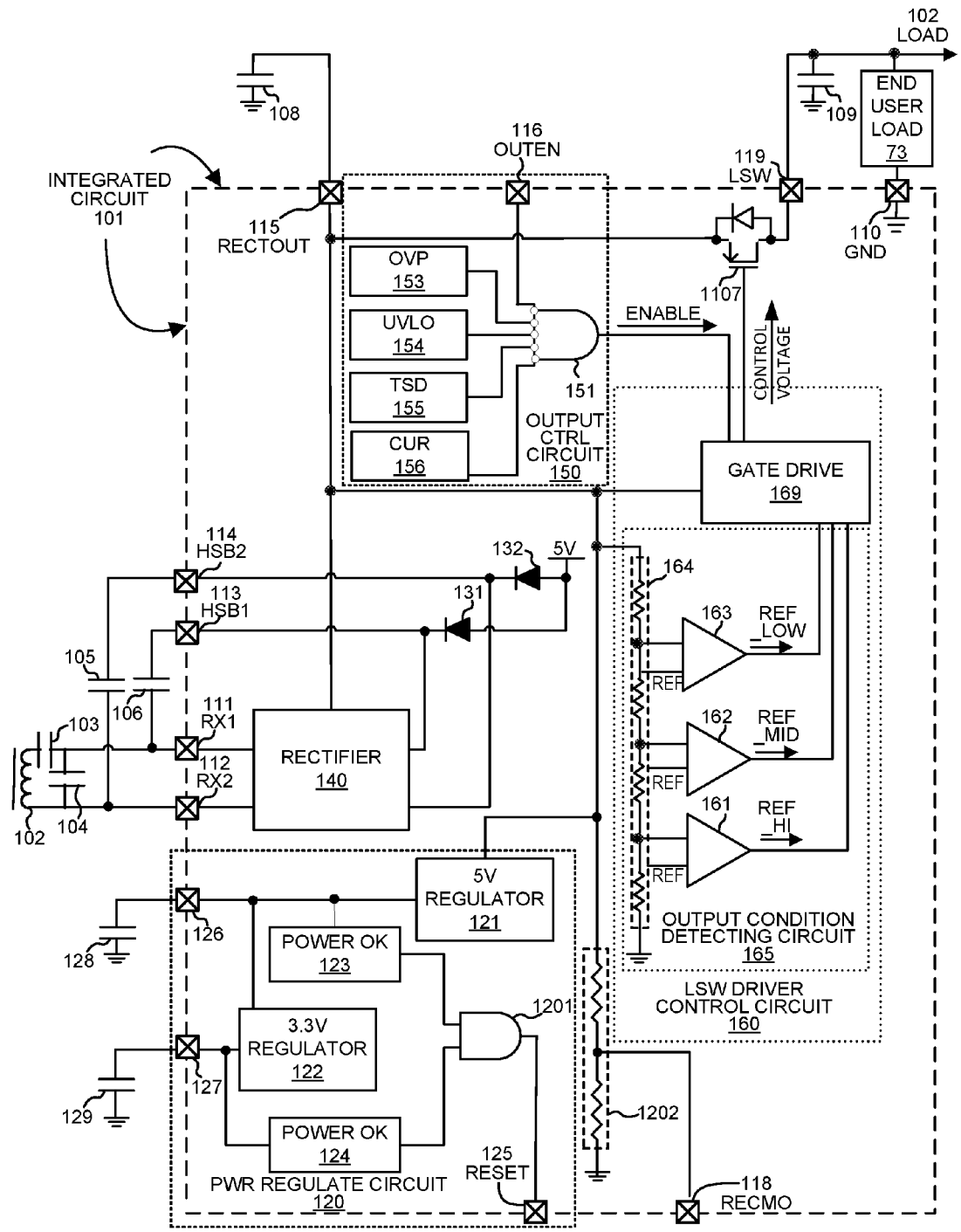
FIG. 4 shows an exemplary integrated circuit for a wireless power receiver, which includes a load switch driver control circuit with an internal load switch.

FIG. 4 shows an exemplary integrated circuit 101 for a wireless power receiver, which includes a p-type load switch driver control circuit with an internal p-type load switch. Similar to FIG. 3, integrated circuit 101 has two input terminals RX1 111 and RX2 112, two high side bootstrap terminals HSB1 113 and HSB2 114, an output terminal RECTOUT 115 and a ground terminal GND 110. An external capacitor 108 is connected to a rectified output terminal RECTOUT 115 and a ground. An external capacitor 109 is connected to a load switch terminal 119 and a ground. An external capacitor 109 is connected to load switch 107 and GND 110. LSW terminal 119 is connected to load 102. End user load 73 is powered by load 102. End user load 73 varies in a large range for different applications. A load switch 1107 is internal to integrated circuit 101. Load switch 1107 is connected to LSW terminal 119, which provides power to end user load 73.

Integrated circuit 101 has a rectifier circuit 140, a bootstrap circuit 130, an output control circuit 150, a power regulate circuit 120 and a LSW driver control circuit 160. LSW driver control circuit 160 has an internal load switch 1107, a gate drive 169 and an output condition detecting circuit 165. Internal load switch 1107 is controlled by gate drive 169. In one novel aspect, gate drive 169 takes inputs from output condition detecting circuit 165, the rectified output and the output from output control circuit 150. Based on the inputs, gate drive 169 outputs a control voltage to adaptively control load switch 1107. FIG. 4 shows a P-type load switch 1107. In another embodiment of the current invention, internal load switch 1107 can be an N-type switch.

FIG. 3 and FIG. 4 show different configurations of a load switch, either internal or external. The internal or external load switch can be either P-type or N-type. Output condition detecting circuit in both FIG. 3 and FIG. 4 is configurable. The number of comparators is configurable. For example, instead of having three comparators, one or two comparators can also be used to provide less levels of control for gate drive 169. Similarly, more than three comparators can be configured to provide more fine-tuned level of control for gate drive 169. Further, for a configured number of comparators, the threshold value for each comparator is also configurable. For example, HI, MID and LOW are all configurable. The configuration can be done through non-volatile memory or by using external variable resistors. The nonvolatile memory can configure the value of REF as shown in FIG. 3 and FIG. 4. Other types of configurations are also available to configure the number of comparisons and the threshold values for comparisons. Once configured, LSW driver control circuit 160 in FIG. 3 and FIG. 4 can adaptively control load switch based on the rectified voltage or output feedback information.

Figure 5:
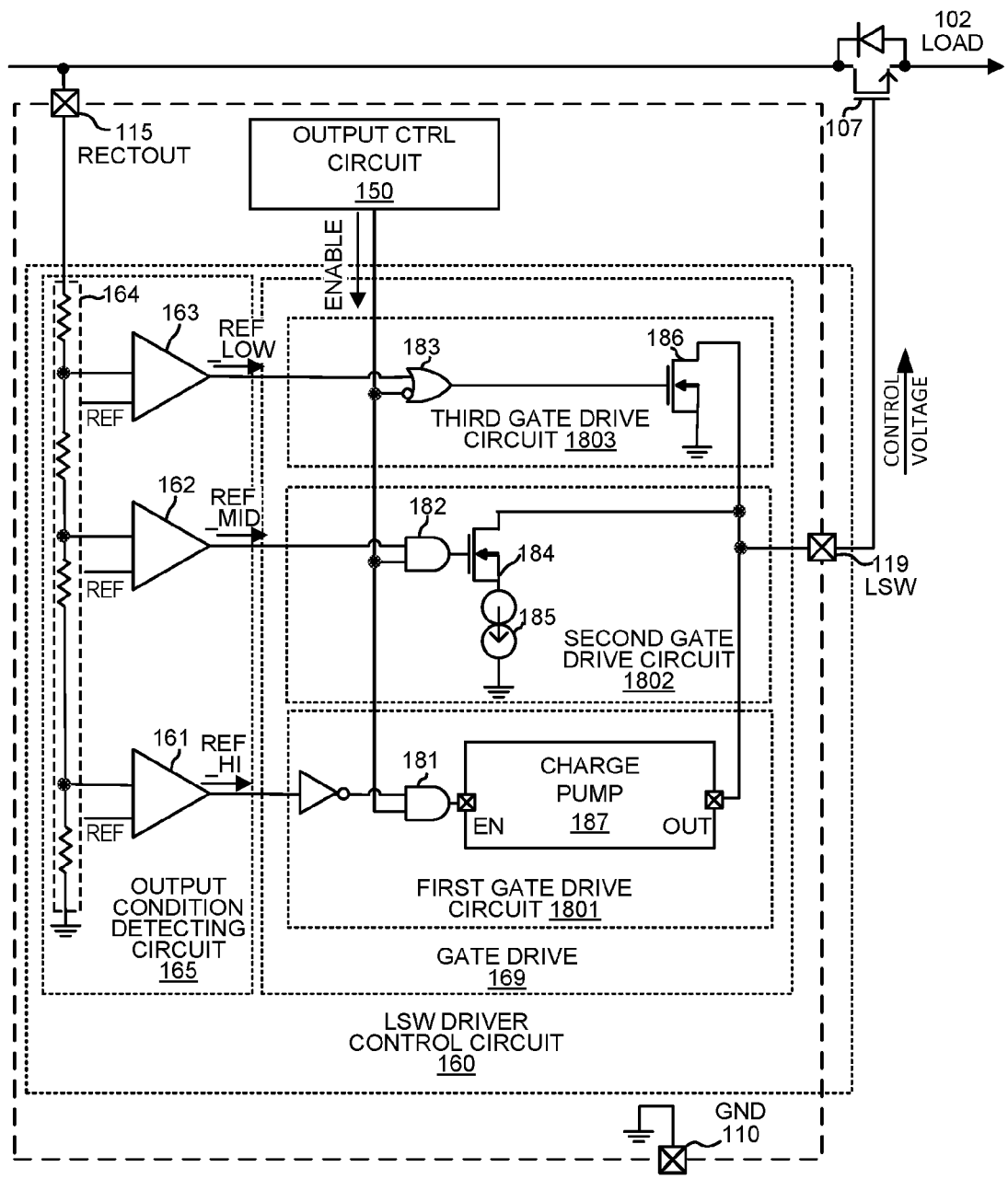
FIG. 5 shows an exemplary circuit diagram for a gate drive with an N-type load switch in accordance with one embodiment of the current invention.

FIG. 5 shows an exemplary circuit diagram for a gate drive 160 for an N-type load switch in accordance with one embodiment of the current invention. LSW driver control circuit 160 has an output condition detecting circuit 165 and a gate drive 169. Gate drive 169 adaptively controls an external N-type load switch 107 based on inputs from output condition detecting circuit 165. In one embodiment of the current invention, gate drive 169 includes a first gate drive circuit 1801, a second gate drive circuit 1802, and a third gate drive circuit 1803.

First gate drive circuit 1801 includes a logic gate 181. Logic gate 181 takes an enable signal from an output control circuit 150 and an inverted output condition signal REF_HI from a comparator 161 of output condition detecting circuit 165. Upon detecting that the rectified output is higher than a predefined threshold HI and the enable signal from output control circuit 150, logic gate 181 sends a LSW enable signal to a charge pump 187 of first gate drive circuit 1801. Charge pump 187 is connected to load switch 107 through LSW terminal 119. Charge pump 187, upon being enabled, drives the gate of load switch 107 and quickly turns on load switch 107. Second gate drive circuit 1802 includes a logic gate 182. Logic gate 182 takes the enable signal from output control circuit 150 and an output condition signal REF_MID from a comparator 162 of output condition detecting circuit 165. Upon detecting the rectified output is lower than a predefined threshold MID and the enable signal from output control circuit 150, logic gate 182 turns on a switch 184. A current source 185 is connected to the source of switch 184 and GND 110. The drain of switch 184 is connected to LSW terminal 119. Once gate drive 169 turns on switch 184, current source 185 slowly pulls down the gate of load switch 107. In another embodiment, current source 185 can be a resistor or a variable resistor. Third gate drive circuit 1803 includes a logic OR gate 183. Logic OR gate 183 takes an inverted enable signal from output control circuit 150 and an output condition signal REF_LOW from a comparator 163 of output condition detecting circuit 165. Upon detecting a disable signal from output control circuit 150 or the rectified output is lower than a predefined LOW threshold, a switch 186 is turned on. The source of switch 186 is connected to GND 110 and the drain is connected to LSW terminal 119. Once switch 186 is turned on, the gate of load switch 107 is quickly pulled down. Load switch 107 is turned off quickly so that the end user load does not pull additional power resulting in the rectified output at RECTOUT 115 increasing.

FIG. 5 shows a four stage adaptive control gate drive. Gate drive 169 takes in rectified voltage or output feedback information from output condition detecting circuit 165 and output control circuit 150. Based on the input information, gate drive 169 turns on load switch 107 differently or shuts down load switch 107. The feedback threshold values are configurable. In one embodiment of the current invention, four-stage control method is implemented with three predefined feedback threshold value of HI, MID and LOW, where HI is greater than MID and MID is greater than LOW.

When the rectified output is greater than HI, the outputs of comparator 161, 162 and 163 are all low. Therefore, charge pump 187 is turned on while switch 184 and 186 are turned off. In this condition, load switch 107 is quickly turned on. In the situation where end user load 73 is relatively low and the primary coil and the secondary coil are in good alignment, wireless power receiver can be quickly turned on. When the rectified output is lower than HI but higher than MID, charge pump 187 is turned off as well as switch 184 and 186. Load switch 107 has large capacitance on gate. Therefore, the voltage between the gate and the source holds constant and load 102 output stays at the current level. If the rectified output continues to fall below MID but still higher than LOW, charge pump 187 is turned off. In this condition, switch 184 is turned on. Switch 186 remains off. Upon turning on switch 184, current source 185 slowly pulls charge off load switch 107 gate capacitance resulting in slowly reducing the voltage between the gate and source of load switch 107.

In certain situation, these steps will effectively increase the rectified output. If the rectified output goes up to above MID, switch 184 will be turned off. This may cause the rectified output to continue going up. If the rectified output goes back to higher than HI, charge pump 187 will be turned on again to quickly turn on load switch 107.

If after slowly pulling charge off of load switch 107, the rectified output continues to drop to below the predefined LOW, then switch 186 is turned on. Upon turning on switch 186, gate drive 169 pulls down the gate of load switch 107 through switch 186. This reduces the current through load switch 107 to zero and allows the rectified output to recover. Further, if the enable signal from output control circuit 150 is de-asserted to disable gate drive 169, charge pump 187 and switch 184 are both turned off while switch 186 is turned on. The de-asserted enable signal from output control circuit 150 will also pull down the gate of load switch 107.

By using different stages of methods to control the load switch, the circuit can adapt to different end user loads to best protect the circuit from being reset while also providing fast ramp up when possible. In another embodiment of the current invention, the N-type load switch 107 can be internal to the integrated circuit as shown in FIG. 4.

Figure 6:
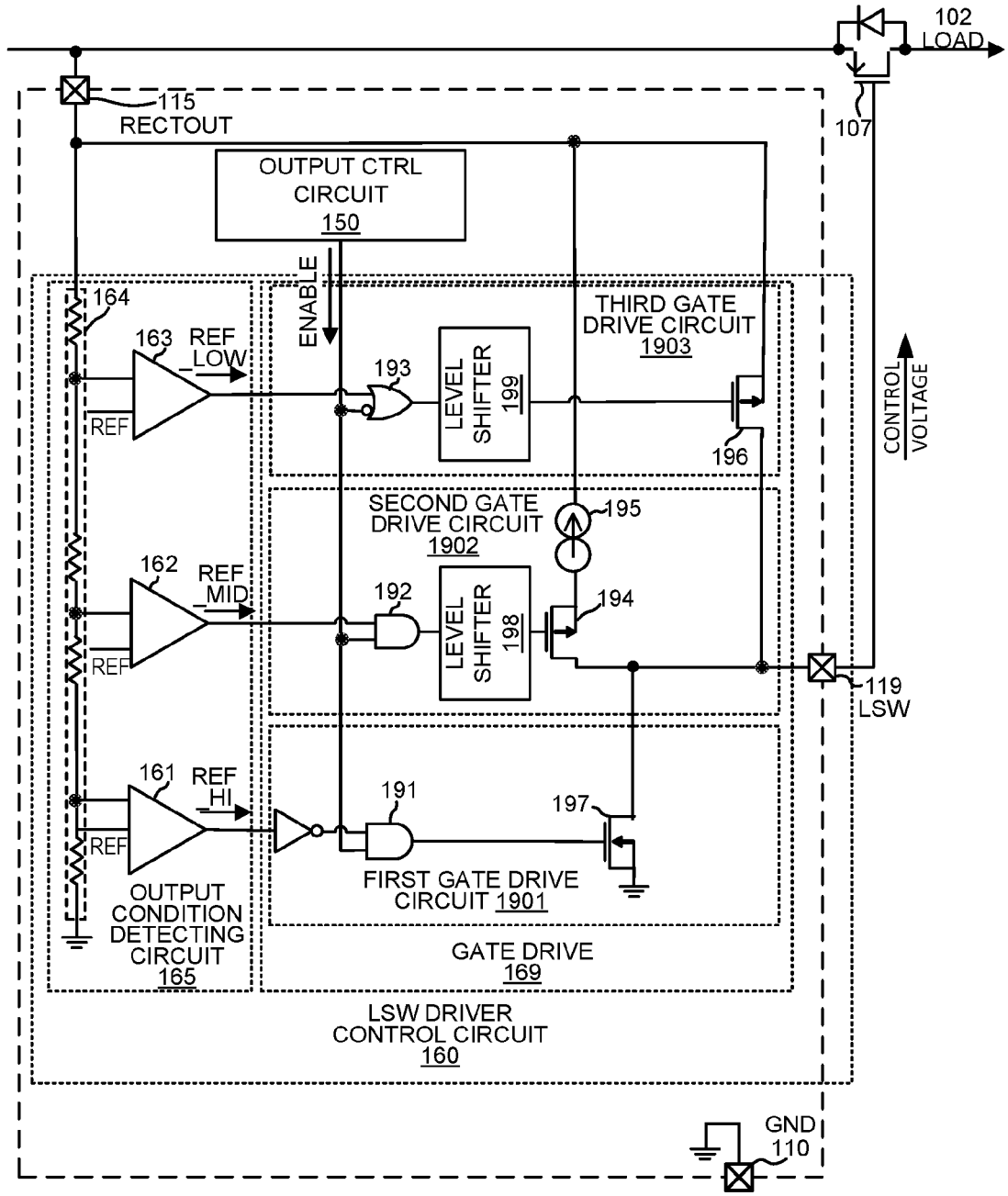
FIG. 6 shows an exemplary circuit diagram for a gate drive with a P-type load switch in accordance with one embodiment of the current invention.

FIG. 6 shows an exemplary circuit diagram for a gate drive 160 for a P-type load switch in accordance with one embodiment of the current invention. LSW driver control circuit 160 has output condition detecting circuit 165 and gate drive 169. Gate drive 169 adaptively controls an external P-type load switch 107. In one embodiment of the current invention, gate drive 169 includes a first gate drive circuit 1901, a second gate drive circuit 1902, and a third gate drive circuit 1903.

First gate drive circuit 1901 includes a logic gate 191. Logic gate 191 takes an enable signal from output control circuit 150 and an inverted output condition signal REF_HI from a comparator 161 of output condition detecting circuit 165. Upon detecting that the rectified output is higher than a predefined threshold HI and the enable signal from output control circuit 150, logic gate 191 turns on switch 197. Switch 197 is connected to a ground terminal GND 110 and a LSW terminal 119. Switch 197, upon being enabled, quickly pulls down the gate of P-type load switch 107 and thereby, quickly turns on load switch 107. Second gate drive circuit 1902 includes a logic gate 192. Logic gate 192 takes the enable signal from output control circuit 150 and an output condition signal REF_MID from a comparator 162 of output condition detecting circuit 165. Upon detecting that the rectified output is lower than a predefined threshold MID and the enable signal from output control circuit 150, logic gate 192 turns on a switch 194 through a level shifter 198. A current source 195 is connected to the source of switch 194 and a rectified output terminal RECTOUT 115. In another embodiment, current source 195 can be a resistor or a variable resistor. The drain of switch 194 is connected to LSW terminal 119. Once gate drive 169 turns on switch 194, current source 195 slowly pulls up the gate of load switch 107. Third gate drive circuit 1903 includes a logic OR gate 193. Logic OR gate 193 takes an inverted enable signal from output control circuit 150 and an output condition signal REF_LOW from a comparator 163 of output condition detecting circuit 165. Upon detecting a disable signal from output control circuit 150 or that the rectified output is lower than a predefined LOW threshold, a switch 196 is turned on. The gate of switch 196 is connected to a level shifter 199, which is connected to the output of logic OR gate 193. The source of switch 196 is connected to RECTOUT 115 and the drain is connected to LSW terminal 119. Once switch 196 is turned on, the gate of load switch 107 is quickly pulled up to RECTOUT. Load switch 107 is turned off quickly so that the end user load does not pull additional power resulting in rectified output at RECTOUT 115 increasing.

FIG. 6 shows a four-stage adaptive control gate drive. Gate drive 169 takes in rectified voltage or output feedback information from output condition detecting circuit 165 and output control circuit 150. Based on the input information, gate drive 169 turns on load switch 107 differently or shuts down load switch 107. The feedback threshold values are configurable. In one embodiment of the current invention, four-stage control method is implemented with three predefined feedback threshold values of HI, MID and LOW, where HI is greater than MID and MID is greater than LOW.

When the rectified output is greater than HI, the outputs of comparators 161, 162 and 163 are all low. Therefore, switch 197 is turned on while switch 194 and 196 are turned off. In this condition, P-type load switch 107 is quickly turned on. In the situation where end user load is relatively low and the primary coil and the secondary coil are in good alignment, wireless power receiver can be quickly turned on. When the rectified output is lower than HI but higher than MID, switch 197 is turned off as well as switch 194 and 196. Load switch 107 has a large capacitance on the gate. Therefore, the voltage between the gate and the source holds constant and the load 102 output stays at the current level. If the rectified output continues to fall to below MID but still higher than LOW, switch 197 is turned off. In this condition, switch 194 is turned on. Switch 196 remains off. Upon turning on switch 194, current source 195 slowly puts charge on load switch 107 gate capacitance resulting in slowly increasing the voltage between the gate and source of load switch 107.

In certain situation, these steps will effectively increase the rectified output. If the rectified output goes up to above MID, switch 194 will be turned off. This may cause the rectified output to continue going up. If the rectified output goes back to higher than HI, switch 197 will be turned on again to quickly turn on load switch 107.

If after slowly putting charge on the gate of load switch 107, the rectified output continues to drop to below the predefined LOW, switch 196 is turned on. Upon turning on switch 196, gate drive 169 pulls up the gate of load switch 107 to the rectified output through switch 196. This will reduce the current through load switch 107 to zero and allows the rectified output to recover. Further, if the enable signal from output control circuit 150 is de-asserted to disable gate drive 169, switch 197 and switch 194 are both turned off while switch 196 is turned on. The de-asserted enable signal from output control circuit 150 will also shut down load switch 107 quickly.

By using different stages of methods to control load switch, the circuit can adapt to different end user loads to best protect the circuit from being reset while also providing fast ramp up when possible. In another embodiment of the current invention, the P-type load switch 107 can be internal to the integrated circuit as shown in FIG. 4.

Although FIG. 5 and FIG. 6 show gate drive 169 includes first, second and third gate circuits, more than three of such circuits can be used for gate drive 169. It may be designed to define more threshold values for output condition detecting circuit 165. Similarly gate drive 169 can be configured to have only two of such gate drive circuits.

By using the LSW driver control circuit to adaptively control the load switch, the wireless power receiver can adaptively control the load switch. In the situations that the rectified output drops too low, the gate drive will adaptively pull down the load switch to allow the rectified output to come back. In the situation when the rectified output can sufficiently support the end user load, the gate drive can quickly turn on the load switch. With the adaptive auto detection and auto control of the gate drive, the integrated circuit for the wireless pick up unit can be used in a wide range of applications with both the protection and without unnecessarily sacrificing the ramp up speed. The overall performance for any given load is optimized to avoid reset of the chip as well as to provide fast powering up when possible.

Figure 7:
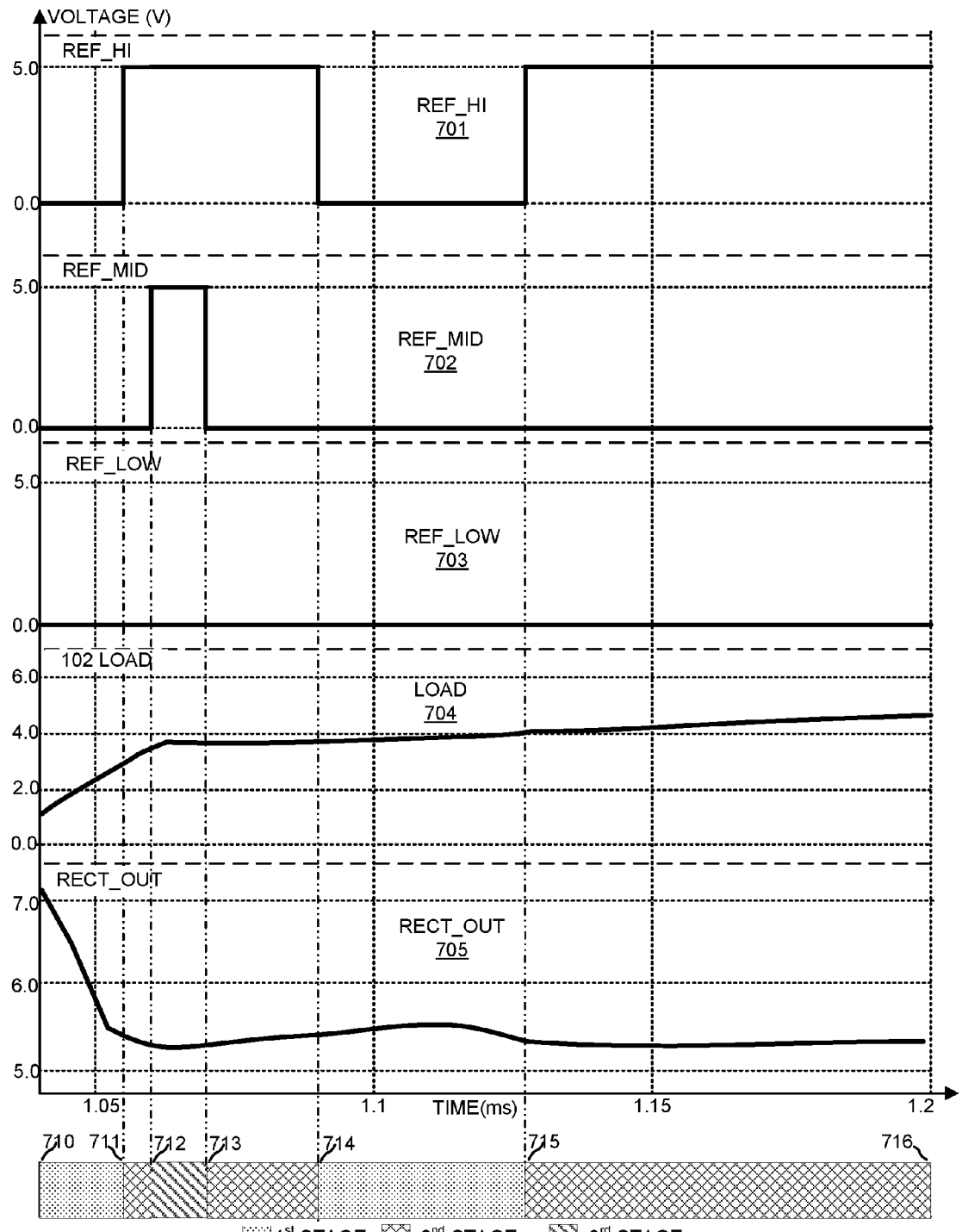
FIG. 7 shows exemplary wave forms using auto detection load switch driver control circuit where the external capacitance for RECTOUT is 33 µF, and the external capacitance for Load is 33 µF.

FIG. 7 shows exemplary wave forms using auto detection load switch driver control circuit where the external capacitance for RECTOUT CRECTO is 33 µF, and the external capacitance for load CLOAD is 33 µF. Referring to FIG. 3 to FIG. 6, FIG. 7 shows output REF_HI wave form 701, output REF_MID wave form 702, output REF_LOW wave form 703, output load 102 wave form 704 and rectified output RECT_OUT wave form 705. The horizontal axis is time in milliseconds. The vertical axis is voltage in volts. FIG. 7 shows a specific setting of an application, where external capacitor 108 connects to RECTOUT 115 and has a capacitance value of 33 µF. The external capacitor 109 that connects to load 102 has a capacitance value of 33 µF. The LSW driver control circuit is configured to four-stage with thresholds HI set to 5.5V, MID set to 5.25V and LOW set to 5V. In this setting, the rectified output can power up the end user load quickly. As shown in wave form 704, at time around 1.125 milliseconds, load 102 goes up to over 4V.

Starting at time 710, REF_HI, REF_MID and REF_LOW all goes low at 0V. The circuit enters first stage and the load switch is quickly turned on. The load output quickly goes over 2V. As the LOAD goes up, RECT_OUT goes down quickly. At time 711, the RECT_OUT goes below threshold HI of 5.5, REF_HI goes high to 5V. REF_MID and REF_LOW remain low. The fast turning up load switch is stopped and circuit enters the second state of holding. The large capacitance of the load switch maintains the load output to continue going up causing the RECT_OUT to continue going down. At time 712, RECT_OUT output goes below the predefined MID threshold. REF_MID goes high with REF_HI remains high and REF_LOW remains low. The circuit enters the third stage. The gate drive now slowly pulls down the load switch. The RECT_OUT stops dropping and slowly pulls back. At time 713, RECT_OUT goes back higher than predefined threshold MID. REF_MID goes low while REF_HI remains high and REF_LOW remains low. The gate drive stops slowly pulling down the load switch but goes back to the second stage to hold. RECT_OUT continues going up. At time 715, RECT_OUT goes back to higher than threshold HI. REF_HI goes low while REF_MID and REF_LOW remain low. The gate drive quickly turns on the load switch. Load 102 steadily goes up. At time 716, RECT_OUT remains higher than threshold HI.

As shown in FIG. 7, in the situation that the end user load does not cause rapid drop to rectified out, the output to load 102 can be ramped up quickly because the gate drive can adaptively using methods of fast turning on the load switch or holding or slowly pulling down the load switch. In this setting, the fourth stage of quickly pulling down the load switch is not needed. The wireless power pick up unit automatically detects its output condition and uses this feedback information to adaptively control the load switch.

Figure 8:
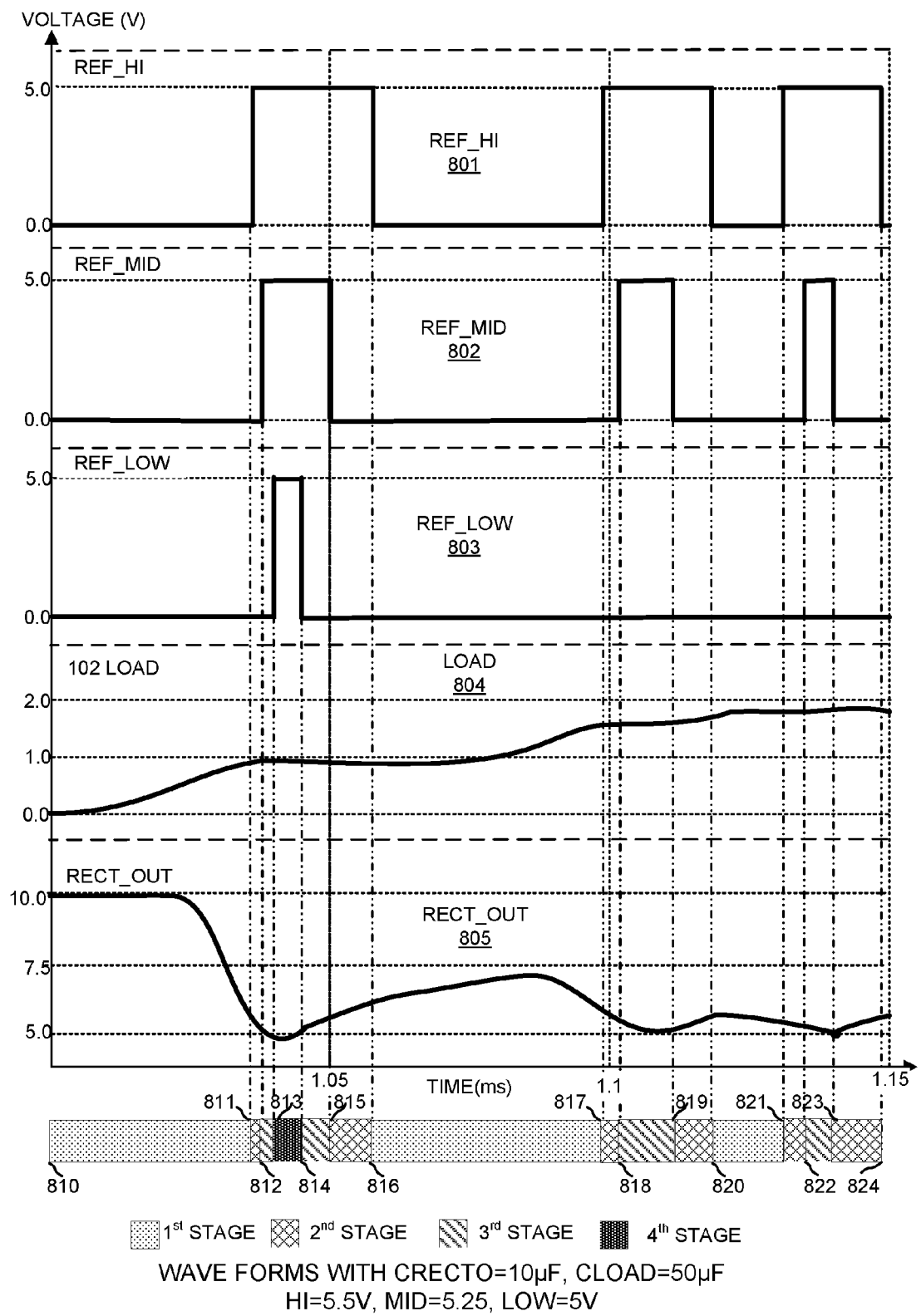
FIG. 8 shows exemplary wave forms using auto detection load switch driver control circuit where the external capacitance for RECTOUT is 10 µF, and the external capacitance for Load is 50 µF.

FIG. 8 shows exemplary wave forms using auto detection load switch driver control circuit where the external capacitance for RECTOUT CRECTO is 10 µF, and the external capacitance for load CLOAD is 50 µF. Referring to FIG. 3 to FIG. 6, FIG. 8 shows output REF_HI wave form 801, output REF_MID wave form 802, output REF_LOW wave form 803, output load 102 wave form 804 and rectified output RECT_OUT wave form 805. The horizontal axis is time in milliseconds. The vertical axis is voltage in volts. FIG. 8 shows a specific setting of an application, where external capacitor 108 connecting to RECTOUT 115 has a capacitance value of 10 µF. The external capacitor 109 connecting to load 102 has a capacitance value of 50 µF. The LSW driver control circuit is configured to have four-stages with thresholds HI set to 5.5V, MID set to 5.25V and LOW set to 5V. In this setting, the end user load causing the RECT_OUT output drop quickly. Protections methods such as slowly pulling down the load switch or shutting down the load switch quickly are needed to prevent the RECT_OUT from dropping too low. The end user load goes up to below 2V in about 1.15 milliseconds. Although it goes up slowly, the RECT_OUT is kept to above a certain threshold such that it is not restarted.

Starting at time 810, REF_HI, REF_MID and REF_LOW all goes low at 0V. The circuit enters first stage and the load switch is quickly turned on. The LOAD output quickly goes up. As the load goes up, RECT_OUT goes down quickly. At time 811, the RECT_OUT goes below threshold HI of 5.5V, REF_HI goes high. REF_MID and REF_LOW remains low. The fast turning up load switch is stopped and circuit enters the second state of holding. The large capacitance of the load switch maintains the load output to continue going up causing the RECT_OUT to continue going down. At time 812, RECT_OUT output goes below the predefined MID threshold. REF_MID goes high with REF_HI remains high and REF_LOW remains low. The circuit enters the third stage. The gate drive now slowly pulls down the load switch. The RECT_OUT output continues to drop. At time 813, RECT_OUT goes below threshold LOW. REF_LOW goes high while REF_HI and REF_MID remain high. The circuit enters the fourth stage. The gate drive quickly pulls down the load switch. RECT_OUT starts going up. At time 814, RECT_OUT goes up to above threshold LOW. RECT_LOW goes to low while RECT_HI AND RECT_MID remains high. The circuit goes back to the third stage of slowing pulling down the load switch. As the RECT_OUT continues going up, at time 815, RECT_OUT goes above threshold MID. REF_MID goes low while RECT_HI remains high and RECT_LOW remains low. The circuit stops pulling down the load switch and enters the second stage of holding. RECT_OUT goes up. At time 816, RECT_OUT goes above threshold HI. REF_HI goes low while REF_MID and REF_LOW remain low. The circuit enters the first stage by fast turn on of the load switch.

As shown in the first several stage transitions, the gate drive adaptively adjusts its methods based on the feedback information from the RECT_OUT. It prevents the RECT_OUT from going down too fast and too low to cause a reset. At the same time, as the RECT_OUT slowly goes back, the gate drive can adaptively ramp up the speed of the turning on of the load switch. The ramping up speed is configurable. In one embodiment of the current invention, the ramp up speed can be configured by configuring a ramp up rate. The configuration can be done through non volatile memory or other methods. FIG. 8 also shows that the adaptively method can be repeatedly used to power up the end user load.

After going back to the first stage of fast turning on the load switch, RECT_OUT continues going up before it starts to drop again. At time 817 it drops to below threshold HI. The circuit adaptively repeats its steps. At time 817, the circuit enters the second stage. At time 818, the circuit enters the third stage due to continuous drop of RECT_OUT. At 819, the circuit goes back the $2^{nd}$ stage. As the RECT_OUT continues going up, at time 820, the circuit goes back the first stage to fast turn on of the load switch. The automatic detect and adaptive control continues. At time 821, RECT_OUT drops below threshold HI. The circuit enters the second stage. At time 822, with the RECT_OUT continuing dropping, the circuit enters the third stage. At time 823, the circuit goes back to the second stage.

Figure 9:
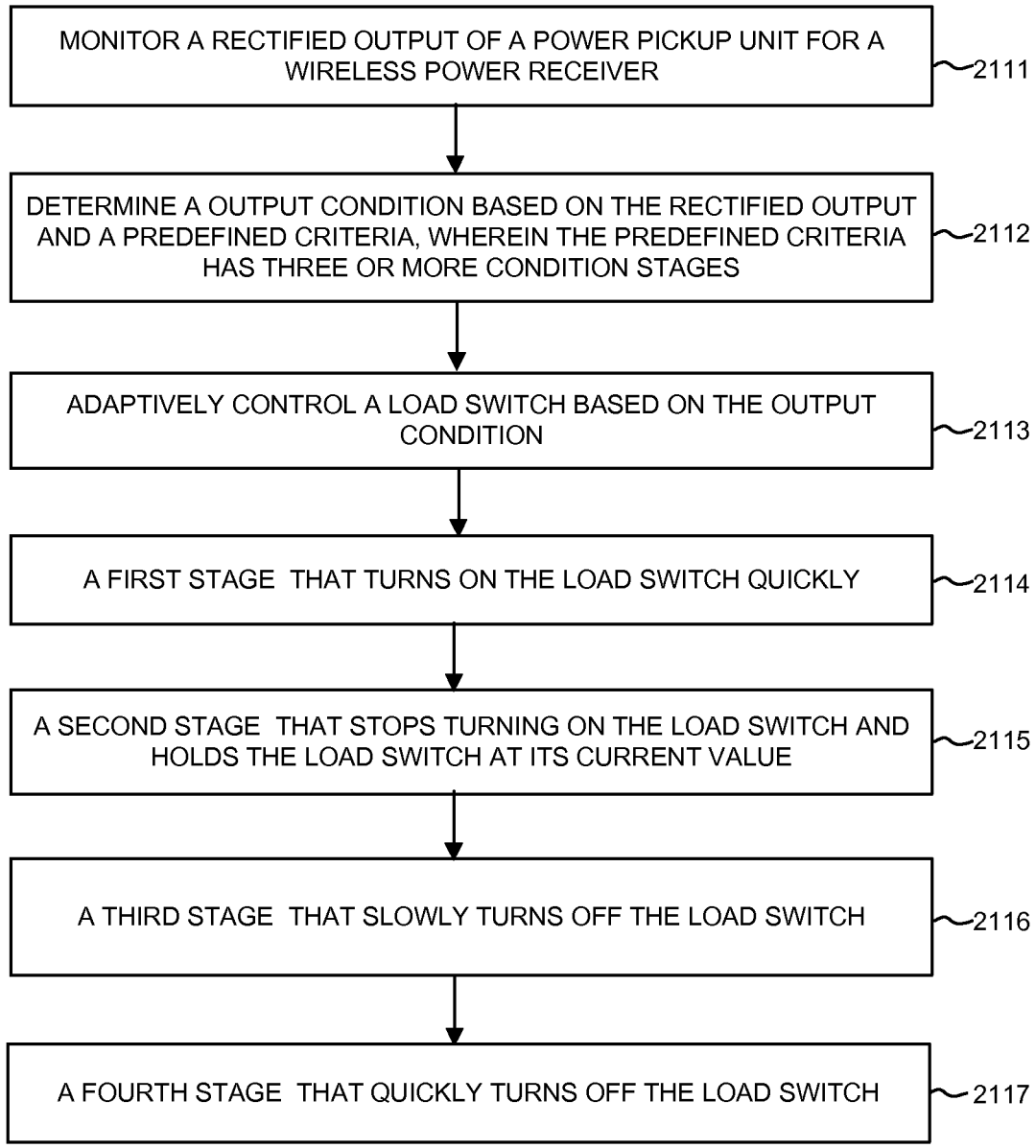
FIG. 9 is a flowchart of a method for using automatic load switch detection for a wireless power receiver.

FIG. 9 is a flowchart of a method for using automatic load switch detection for a wireless power receiver. A wireless load switch (LSW) driver control circuit monitors a rectified output of a power pick unit (step 2111). The wireless LSW drive control circuit determines an output condition based on the rectified output and a predefined criteria (step 2112), wherein the predefined criteria has three or more condition stages. The wireless LSW driver control circuit adaptively controls a LSW based on the output condition (step 2113). The method includes four stages. A first stage is to turn on the load switch quickly (step 2114). The second stage is to stop turning on the load switch and holds the load switch at its current value (step 2115). The third stage is to slowly turn off the load switch (step 2116). The fourth stage is to quickly turn off the load switch (step 2117).

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. An apparatus comprising:
a first rectifier input terminal (RX1);
a second rectifier input terminal (RX2);
a rectified output terminal (RECTOUT);
a rectifier circuit that receives input power from RX1 and RX2 and outputs a rectified voltage onto RECTOUT; and
an adaptive load switch (LSW) driver control circuit coupled to RECTOUT and a load switch, wherein the adaptive LSW driver control circuit receives the rectified voltage and outputs a control voltage to adaptively control the load switch to ramp up at different rates based on the rectified voltage and a predefined criteria, and wherein the control voltage is generated by performing at least two comparisons involving the rectified voltage.
2. The apparatus of claim 1, wherein the apparatus is an integrated circuit for a wireless power receiver.
3. The apparatus of claim 2, wherein the load switch is internal to the integrated circuit.
4. The apparatus of claim 2, wherein the load switch is external to the integrated circuit.
5. The apparatus of claim 1, wherein the predefined criteria are configurable through a nonvolatile memory or an external resistor.
6. An apparatus comprising:
a first rectifier input terminal (RX1);
a second rectifier input terminal (RX2);
a rectified output terminal (RECTOUT);
a rectifier circuit that receives input power from RX1 and RX2 and outputs a rectified voltage onto RECTOUT; and an adaptive load switch (LSW) driver control circuit coupled to RECTOUT and a load switch, wherein the adaptive LSW driver control circuit receives the rectified voltage and outputs a control voltage to adaptively control the load switch to ramp up at different rates based on the rectified voltage and a predefined criteria, wherein the LSW driver control circuit compares the rectified voltage with one or more predefined voltage values, wherein the one or more predefined voltage values is configurable, and wherein the load switch is controlled to switch in one of a plurality of stages.

7. The apparatus of claim 6, wherein the LSW driver control circuit comprises:
an output condition detecting circuit, wherein the output condition detecting circuit comprises one or more serially connected resistors and one or more comparators, wherein the resistors are coupled to RECTOUT and a ground; and
a gate drive circuit, wherein the gate drive circuit receives output condition signals from the output condition detecting circuit and outputs the control voltage to adaptively control the load switch based on the received output condition signals.

8. An apparatus comprising:
a first rectifier input terminal (RX1);
a second rectifier input terminal (RX2);
a rectified output terminal (RECTOUT);
a rectifier circuit that receives input power from RX1 and RX2 and outputs a rectified voltage onto RECTOUT; and
an adaptive load switch (LSW) driver control circuit coupled to RECTOUT and a load switch, wherein the adaptive LSW driver control circuit receives the rectified voltage and outputs a control voltage to adaptively control the load switch based on the rectified voltage and a predefined criteria, wherein the LSW driver control circuit compares the rectified voltage with one or more predefined voltage values, wherein the one or more predefined voltage values is configurable, wherein the LSW driver control circuit comprises:
an output condition detecting circuit, wherein the output condition detecting circuit comprises one or more serially connected resistors and one or more comparators, wherein the resistors are coupled to RECTOUT and a ground; and
a gate drive circuit, wherein the gate drive circuit receives output condition signals from the output condition detecting circuit and outputs the control voltage to adaptively control the load switch based on the received output condition signals, wherein the gate drive circuit adaptively controls the load switch based on output conditions, and wherein the gate drive circuit comprises:
a first gate drive circuit, wherein the first gate drive circuit is turned on to turn on the load switch when a first output condition is met;
a second gate drive circuit, wherein the second gate drive circuit is turned on when a second or a third output condition is met, wherein the second gate drive circuit stops turning on the load switch and holding the load switch at its current value when the second output condition is met, and wherein the second gate drive circuit pulls down a voltage on a gate of the load switch when the third output condition is met; and
a third gate drive circuit, wherein the third gate drive circuit is turned on to turn off the load switch when a fourth output condition is met.

9. A method comprising:
monitoring a rectified output of a power pickup unit for a wireless power receiver;
determining an output condition based on the rectified output and a predefined criteria, wherein the predefined criteria has three or more condition stages; and
adaptively controlling a load switch to ramp up at different rates, wherein the controlling of the load switch is based on the output condition.

10. The method of claim 9, wherein the predefined criteria are configurable.

11. The method of claim 10, wherein the predefined criteria are a set of voltage range values, and wherein the output condition is determined by comparing the rectified output with the set of voltage range values.

12. A method comprising:
monitoring a rectified output of a power pickup unit for a wireless power receiver;
determining an output condition based on the rectified output and a predefined criteria, wherein the predefined criteria has three or more condition stages; and
adaptively controlling a load switch based on the output condition, wherein the adaptive controlling involves:
a first stage that turns on the load switch at a first rate;
a second stage that stops turning on the load switch;
a third stage that pulls down a voltage on a gate of the load switch at a second rate; and
a fourth stage that turns off the load switch at a third rate.

13. The method of claim 12, wherein the third stage involves adaptively adjusting a turn on rate of the load switch, and wherein the turn on rate is configurable.

14. An apparatus comprising:
a first rectifier input terminal (RX1);
a second rectifier input terminal (RX2);
a rectified output terminal (RECTOUT);
a rectifier circuit that receives input power from RX1 and RX2 and outputs a rectified voltage onto RECTOUT; and
means for adaptively controlling a load switch, wherein the load switch can be adaptively ramped up at different rates based on the rectified output voltage and a predefined criteria, and wherein a rate the load switch is ramped up at depends on a comparison involving the output voltage.

15. The apparatus of claim 14, wherein the apparatus is an integrated circuit for a wireless power receiver.

16. The apparatus of claim 15, wherein the load switch is internal to the integrated circuit.

17. The apparatus of claim 15, wherein the load switch is external to the integrated circuit.

18. An apparatus comprising:
a first rectifier input terminal (RX1);
a second rectifier input terminal (RX2);
a rectified output terminal (RECTOUT);
a rectifier circuit that receives input power from RX1 and RX2 and outputs a rectified voltage onto RECTOUT; and
means for adaptively controlling a load switch, wherein the load switch can be adaptively ramped up at different rates based on the rectified output voltage and a predefined criteria, and wherein the predefined criteria are configurable.

19. The apparatus of claim 18, wherein the means comprises:
- an output condition detecting circuit that determines an output condition by comparing the rectified output voltage with a set of predefined voltage range values; and
- a gate drive circuit that adopts a controlling method from a set of predefined controlling methods based on the output condition.

20. An apparatus comprising:
- a first rectifier input terminal (RX1);
- a second rectifier input terminal (RX2);
- a rectified output terminal (RECTOUT);
- a rectifier circuit that receives input power from RX1 and RX2 and outputs a rectified voltage onto RECTOUT; and
- means for adaptively controlling a load switch, wherein the load switch can be adaptively switched ON at different rates based on the rectified output voltage and a predefined criteria, wherein the predefined criteria are configurable, and wherein the means comprises:
- an output condition detecting circuit that determines an output condition by comparing the rectified output voltage with a set of predefined voltage range values; and
- a gate drive circuit that adopts a controlling method from a set of predefined controlling methods based on the output condition, and wherein the controlling methods comprise:
  - a first stage that turns on the load switch at a first rate;
  - a second stage that stops turning on the load switch;
  - a third stage that pulls down a voltage on a gate of the load switch at a second rate; and
  - a fourth stage that turns off the load switch at a third rate.

* * * * *